Oct. 7, 1969     H. BÄUMLER     3,471,159
SLIDE RING SEAL
Filed Sept. 21, 1961
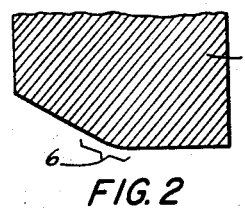
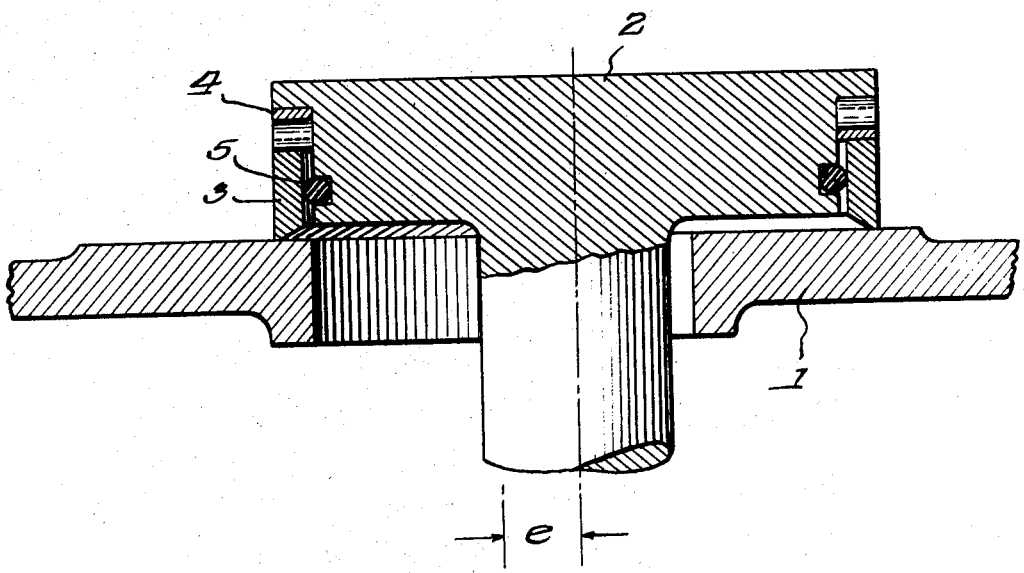
Inventor:
Hermann Bäumler

United States Patent Office 3,471,159
Patented Oct. 7, 1969

3,471,159
SLIDE RING SEAL
Hermann Bäumler, Burscheid, near Cologne, Germany, assignor to Goetzewerke Friedrich Goetze Aktiengesellschaft, Burscheid, near Cologne, Germany, a corporation of Germany
Filed Sept. 21, 1961, Ser. No. 139,803
Claims priority, application Germany, Sept. 24, 1960, G 30,565
The portion of the term of the patent subsequent to Oct. 7, 1982, has been disclaimed
Int. Cl. F16j 15/34, 15/38, 15/54
U.S. Cl. 277—85                                    3 Claims The invention is concerned with a slide ring seal for sealing a movable shaft, having tangential and radial motion components, against the seepage of a fluid medium.

Diverse power-consuming and power-producing machines, including rotating piston engines and devices for stirring of fluid media, present the problem of mutually sealing, against the seepage of liquid, rotating parts which have their axes of rotation displaced parallel to one another. This problem can be solved with the aid of a slide ring seal, that is, a seal having sealing rims or edges which operate in sealing engagement with a plane surface extending perpendicular to the rotation axis.

However, a slide ring seal of this kind, wherein the sealing rim has a motion component in circumferential direction and also a motion component in radial direction, provides a satisfactory action so far as the sealing effect, frictional losses and resistance to wear are concerned, only when the sealing rim is suitably shaped to meet the peculiarities of the above indicated problem.

According to the invention, a satisfactory action of the desired slide ring seal is achieved by forming the sealing rim or end of the movable slide ring, which slides in engagement with a counter surface, at a predetermined angle at the side of the ring which faces away from the fluid medium against which the corresponding movable part is to be sealed.

An example of an embodiment of the invention is described below with reference to the accompanying drawings illustrating the manner of sealing the shaft of a stirring mechanism.

FIGURE 1 is a cross-sectional view of an arrangement incorporating a preferred embodiment of the present invention.

FIGURE 2 is a cross-sectional detailed view of a modified form of construction of the present invention.

Numeral 1 of FIGURE 1 indicates the bottom wall of a stirring vessel or housing having an opening formed therein through which projects the shaft 2 of the stirring mechanism. To the upper flange of the shaft are to be fastened stirring vanes which have been omitted for simplification. The shaft executes a rotary motion about its axis and also a lateral motion with the eccentricity $e$ about the central axis of the opening in the bottom wall of the housing. This additional eccentric motion which is brought about by suitable gear means (not shown) provides for effective turbulence of the fluid or liquid in the housing. The shaft is sealed against seepage of liquid contained in the housing, by the slide ring 3 which rotates with the shaft, such slide ring being pressed against the planar sealing surface of the bottom wall 1 by means of an undulating spring 4. An annular cord ring packing 5 seals the shaft against passage of liquid through the space between the slide ring 3 and the flange of the stirring shaft.

According to the invention, the sealing end or edge of the slide ring 3 facing away from the liquid in the housing, is beveled at a predetermined angle with respect to the plane of the lateral counter or sealing surface of the bottom wall 1 of the housing which is engaged thereby. It is known in the art that such a bevel will serve to channel fluid to the interface region defined between the sealing surface of the bottom wall 1 and the portion of the sealing end of slide ring 3 which directly contacts such sealing surface. It will therefore be readily appreciated by those skilled in the art that the beveled surface of the slide ring 3 will have a similar effect on any of the fluid medium which may have seeped through this interface from the region surrounding ring 3 to the region enclosed thereby, this channeling of fluid back to the region surrounding the ring 3 being induced by the inward radial movement of the ring resulting from the eccentric motion of the shaft 2.

The angle between the bevel and the counter surface may lie between 15 minutes and 30 degrees depending upon the viscosity and pressure of the medium against which the shaft is to be sealed and also upon the speed of sliding in tangential and radial direction. This angle may in particular cases be formed by appropriate rounding of the sealing edge of the slide ring, as is indicated by the rounded portion 6 of the ring 3' shown in FIGURE 2.

Changes may be made within the scope and spirit of the appended claims which define what is believed to be new and desired to have protected by Letters Patent.

I claim:
1. For use in connection with a shaft extending through an opening formed in the wall of a housing containing a liquid medium, said shaft having its axis disposed eccentrically with respect to the central axis of said opening and being rotatable about its own axis and also rotatable eccentrically about the central axis of said opening, a slide ring device for sealing said shaft against seepage of liquid contained in said housing, said device comprising a sealing ring carried by said shaft and being movable therewith, said sealing ring having, at the side of the sealing end thereof which faces the liquid medium in the housing, a sealing surface for forming a seal with a planar counter sealing surface formed by said wall of said housing, and being angularly formed, at the side of the sealing end thereof which faces away from the liquid medium in the housing, to define a surface which lies at an angle to said counter sealing surface, means for exerting elastic pressure on said sealing ring at the other end thereof to press said angularly formed end into elastic freely sliding sealing engagement with said planar counter sealing surface formed by said wall of said housing, and packing sealing means disposed between said shaft and the inside wall of said sealing ring.

2. A slide ring seal according to claim 1, wherein said angularly formed end of said sealing ring forms a bevel extending at a predetermined angle with the plane of said counter sealing surface.

3. A slide ring seal according to claim 1, wherein the sealing end of said sealing ring is rounded to form the angular configuration.

References Cited

UNITED STATES PATENTS

| 2,744,772 | 5/1956  | Amirault et al. | 277—43   |
| 3,010,742 | 11/1961 | Kosatka         | 277—96 X |
| 883,155   | 3/1908  | Westinghouse    | 277—93 X |
| 475,436   | 5/1892  | Cedervall       | 277—93 X |
| 996,446   | 6/1911  | Anderson        | 277—91   |
| 2,881,015 | 4/1959  | Wahl            | 277—96 X |

SAMUEL ROTHBERG, Primary Examiner

U.S. Cl. X.R.
277—93, 96